E. O. BARSTOW.
METHOD OF TREATING BRINE.
APPLICATION FILED MAY 12, 1917.
1,270,589.
Patented June 25, 1918.
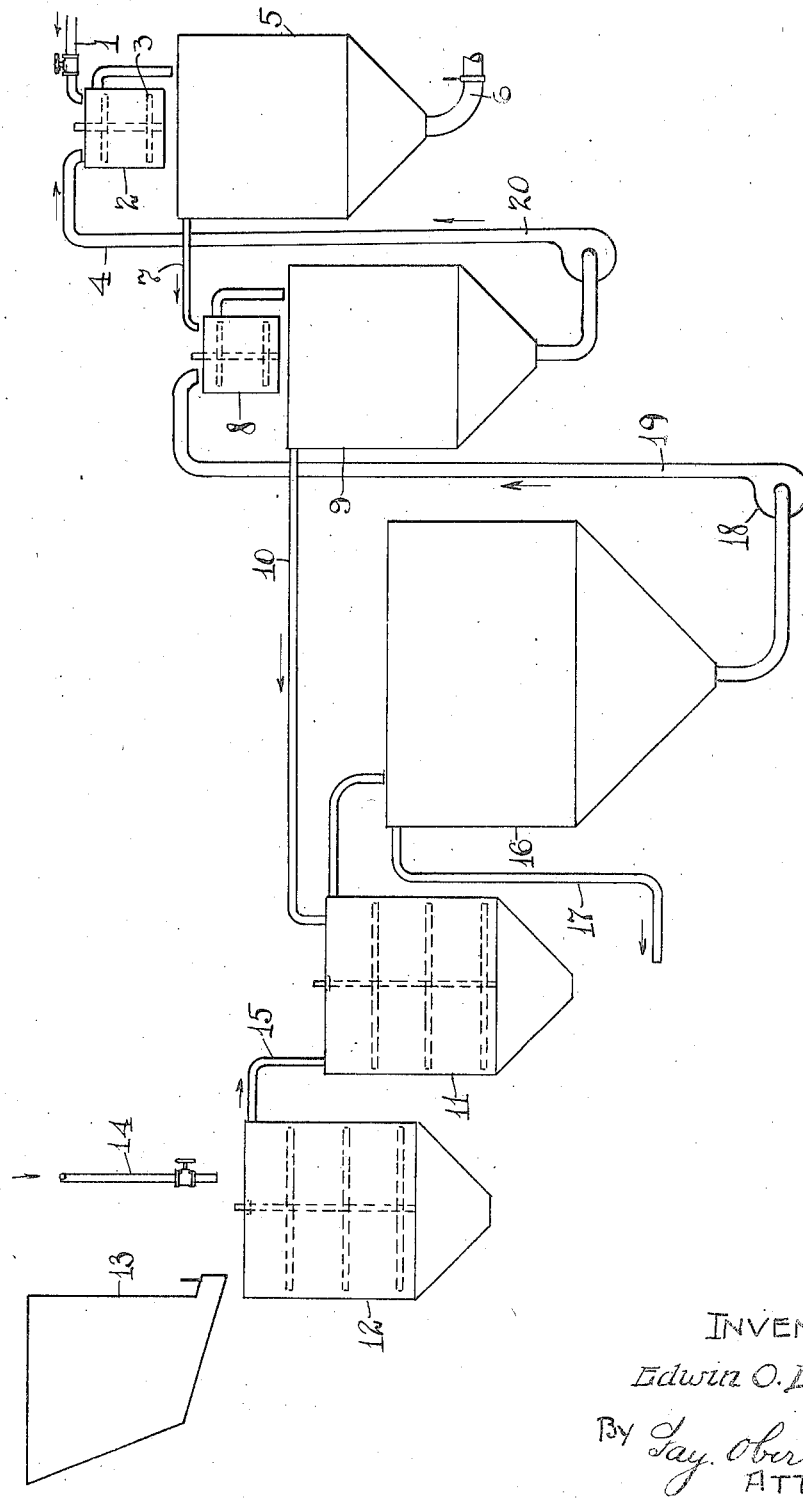
INVENTOR
Edwin O. Barstow.
By Fay. Oberlin & Fay
ATTORNEYS

UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF TREATING BRINE.

1,270,589.　　　　　Specification of Letters Patent.　　Patented June 25, 1918.

Application filed May 12, 1917. Serial No. 168,149.

*To all whom it may concern:*

Be it known that I, EDWIN O. BARSTOW, a citizen of the United States, and a resident of Midland, county of Midland, State of Michigan, have invented a new and useful Improvement in Methods of Treating Brine, of which the following is a specification, the principle of the invention being herein explained and the best mode in which I have contemplated applying that principle, so as to distinguish it from other inventions.

Certain naturally occurring brines, and particularly the brine from the Midland field, have been known for some time as a possible source for not only calcium chlorid, but also magnesium chlorid, such brine containing both of the chlorids named, in addition to the usual sodium chlorid. The commercial utilization of this source has been a more recent development, and several methods are now being practised with more or less success. One that is now in use in the Midland field involves replacing the calcium chlorid in such brine with magnesium chlorid, by treating such brine with magnesium sulfite, according to the following equation:—

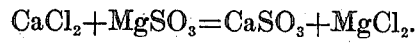

In order, however, to carry out the foregoing reaction, it is necessary of course either to provide the necessary magnesium sulfite or else precipitate the calcium in the form of the sulfite directly. In either case, however, magnesium hydrate is required, being treated with sulfur dioxid either aside from, or in connection with, the main reaction, according to one or the other of the following equations, viz.:—

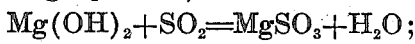

or,

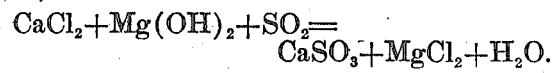

The object of the present improved process, is to produce such magnesium hydrate, whether for use in a process for the manufacture of magnesium chlorid, such as just described, or otherwise, that will be substantially free from calcium hydrate, and at the same time to produce a calcium chlorid brine free from magnesium chlorid.

To the accomplishment of the foregoing and related ends, the invention then consists of the steps hereinafter described and particularly pointed out in the claims; it being understood that while the following description sets forth in detail certain steps embodying the invention, such described steps constitute, however, but one of various ways in which the principle of the invention may be used. Similarly the annexed drawing, in the single figure there appearing, illustrates more or less diagrammatically, only one form of apparatus adapted for use in carrying out my improved process.

In my present improved process the brine employed, as previously stated, contains sodium chlorid, magnesium chlorid and calcium chlorid, any bromids that may have been originally present in the natural product, having been extracted. Such brine, may be conveniently referred to herein as normal brine, and is designed to continuously enter the apparatus at one point, and the desired products to be similarly continuously removed at other points, such products consisting of a brine containing calcium chlorid and sodium chlorid, free from magnesium chlorid, and a precipitate of magnesium hydrate substantially free from calcium hydrate suspended in the normal brine, which contains magnesium chlorid.

Referring to the apparatus illustrated in the drawing, the natural brine is supplied in a continuous stream at the right through the pipe or conduit 1 to a mixing box 2 provided with a suitable stirrer 3, since a sludge mixture is also supplied to such tank through another pipe 4, as will be presently described. The mixture from box 2 overflows into a settling tank 5, from the bottom of which the final sludge product is withdrawn through a pipe 6, while the overflow of clear brine is carried through a pipe 7 to a second mixing box 8, where it meets the sludge mixture, at an earlier stage in its treatment. As before, the mixture of brine and sludge overflows from the box 8 into a settling tank 9, it being from the bottom of this tank that the sludge mixture, as encountered by the brine in mixing box 2, is withdrawn. From this second settling tank 9, the brine overflows and is carried by a pipe 10 to a reaction chamber 11, where it is mixed with milk of lime, prepared in an adjacent slaking tank 12, in which lime, either pure or dolomitic lime, fed from a storage bin 13, is mixed with water supplied through pipe 14, such milk of lime overflowing into the reaction chamber by a connecting pipe 15, as shown.

The lime is designed to be in excess in reaction chamber 11, and so in reacting with the magnesium chlorid in the brine supplied from settling tank 9, precipitates all of such chlorid as magnesium hydrate. A mixture of calcium hydrate and the brine, which holds in solution calcium chlorid and sodium chlorid, accordingly results, and is allowed to flow into the continuous settler 16. The clear brine, which overflows through the pipe 17 from this final settler, contains only calcium chlorid in addition to the continuing content of sodium chlorid, all of the magnesium chlorid being removed, and such brine is hence suitable for the production of pure high test calcium chlorid, by simply evaporating it down to a point where such sodium chlorid will crystallize out.

It is the mixture of calcium and magnesium hydrates, from the bottom of this final settling tank, that is forwarded by means of a pump 18 through pipe 19 to the second mixing box 8, there to be mingled with the overflow of clear brine from the first settling tank 5, as previously described. This brine will still contain some magnesium chlorid, and this will react in the mixing box in question with the excess of lime in the sludge to give magnesium hydrate and calcium chlorid. The sludge from the corresponding settling tank 9 will probably still contain some calcium hydrate, but this is pumped through pipe 20 to the first mixing tank 2, where it is mixed with the normal brine containing its original amount of magnesium chlorid, which will be largely in excess of such calcium hydrate present in the sludge, so that all of such calcium hydrate will be here converted into calcium chlorid, with the formation of magnesium hydrate. The sludge from the corresponding settling tank will accordingly consist of magnesium hydrate, substantially free from calcium hydrate, suspended in the original, or normal, brine, which contains magnesium chlorid as well as calcium chlorid and salt.

The clear brine, which overflows from the first settling tank 5, and which still contains a considerable amount of magnesium chlorid, passes, as previously indicated, to the mixing box 8, where it reacts with the lime in the sludge from the third settling tank 16, to give magnesium hydrate and calcium chlorid. As previously indicated, the clear overflow from the second settling tank 9 goes to the reaction tank 11, where all of the magnesium chlorid is precipitated by reason of the excess of lime.

As a result of the successive steps just described, not only is pure calcium chlorid, free from magnesium chlorid, secured, but also, simultaneously therewith, magnesium hydroxid, which although it is suspended in a solution of brine that contains calcium chlorid, is practically free from admixed calcium hydrate. It will be understood that the calcium chlorid in the solution which carried the magnesium hydrate, is not harmful, but the admixture of calcium hydrate with such magnesium hydrate is objectionable, especially for use in the manufacture of magnesium chlorid by the so-called "sulfite" process, hereinbefore described, because it takes up its equivalent of sulfur to no advantage whatever.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of treating brine containing both calcium and magnesium chlorids, the steps which consist in adding thereto an excess of lime, so as to precipitate all of such magnesium chlorid as hydrate and leave a substantially pure calcium chlorid solution; and then separating such precipitate and adding more such brine thereto to convert any admixed calcium hydrate to magnesium hydrate.

2. In a method of treating brine containing both calcium and magnesium chlorids, the steps which consist in adding thereto an excess of lime, so as to precipitate all of such magnesium chlorid as hydrate and leave a substantially pure calcium chlorid solution; and then separating such precipitate and adding sufficient more such brine to present an excess of magnesium chlorid and thereby convert any admixed calcium hydrate to magnesium hydrate.

3. In a method of treating brine containing both calcium and magnesium chlorids, the steps which consist in adding thereto an excess of lime, so as to precipitate all of such magnesium chlorid as hydrate and leave a substantially pure calcium chlorid solution; and then separating such precipitate and adding sufficient more such brine to present an excess of magnesium chlorid and thereby convert any admixed calcium hydrate to magnesium hydrate, the solution, with reduced content of magnesium chlorid, resulting from such last step being used as the brine in such first step.

4. In a method of treating brine containing both calcium and magnesium chlorids, the steps which consist in adding thereto an excess of lime, so as to precipitate all of such magnesium chlorid as hydrate and leave a substantially pure calcium chlorid solution; and then separating such precipitate and successively adding thereto more such brine to convert any admixed calcium hydrate to magnesium hydrate.

5. In a method of treating brine containing both calcium and magnesium chlorids, the steps which consist in adding thereto an excess of lime, so as to precipitate all of such magnesium chlorid as hydrate and leave a substantially pure calcium chlorid solution; and then separating such precipitate and successively adding thereto more such brine to convert any admixed calcium hydrate to magnesium hydrate, the last addition of brine to such precipitate being sufficient to present an excess of magnesium chlorid, and the solution, with reduced content of magnesium chlorid, resulting from the first such addition being used as the brine in such first step.

6. The method of treating brine containing both calcium and magnesium chlorids, which consists in causing a current thereof and a counter-current of sludge, resulting from the addition of lime to such brine, to encounter each other intermittently.

7. The method of treating brine containing both calcium and magnesium chlorids, which consists in causing a current thereof and a counter-current of sludge, resulting from the addition of lime to such brine, to encounter each other intermittently, the resulting solution constituting the brine to which the lime is thus added.

Signed by me, this 9th day of May, 1917.

EDWIN O. BARSTOW.